United States Patent [19]

Barrington et al.

[11] Patent Number: 5,242,587
[45] Date of Patent: Sep. 7, 1993

[54] FILTER WITH POROUS MEDIA AND ELECTROSTATIC AND MAGNETIC PLATES

[75] Inventors: Barry L. Barrington, Valparaiso, Ind.; Robert K. Rusteberg, Barrington Hills, Ill.

[73] Assignee: Analytic Systems Laboratories, Inc., Hobart, Ind.

[21] Appl. No.: 913,239

[22] Filed: Jul. 14, 1992

Related U.S. Application Data

[63] Continuation-in-part of Ser. No. 862,451, Apr. 2, 1992, abandoned, which is a continuation-in-part of Ser. No. 632,129, Dec. 20, 1990, Pat. No. 5,149,422.

[51] Int. Cl.$^5$ ............................................. B01D 35/06
[52] U.S. Cl. ................................. 210/223; 204/302; 210/232; 210/243; 210/498; 210/500.1; 96/2
[58] Field of Search ............... 204/186, 140, 302, 306, 204/DIG. 5; 96/2; 210/85, 137, 143, 222, 223, 232, 243, 498, 500.1, 501, 502.1, 510.1, 746, 748, 295, 335

[56] References Cited

U.S. PATENT DOCUMENTS

| | | | |
|---|---|---|---|
| 1,831,075 | 10/1931 | Neeley | 210/223 |
| 1,949,660 | 3/1934 | Roberts | 210/223 |
| 3,252,885 | 5/1966 | Griswold | 210/243 |
| 3,393,143 | 7/1968 | Waterman et al. | 204/306 |
| 4,238,326 | 12/1980 | Wolf | 210/243 |
| 4,594,138 | 6/1986 | Thompson | 204/302 |
| 4,657,671 | 4/1987 | Botstiber et al. | 210/243 |
| 4,961,845 | 10/1990 | Dawson et al. | 210/85 |
| 5,149,422 | 9/1992 | Barrington | 210/85 |

FOREIGN PATENT DOCUMENTS 869210 5/1961 United Kingdom .............. 210/223

Primary Examiner—Joseph W. Drodge
Attorney, Agent, or Firm—Laff, Whitesel, Conte & Saret

[57] ABSTRACT

A fluid filter is designed primarily but not exclusively to filter spent fluids which may contain particulate contaminants. The filter has an assembly which may be slid into or out of a canister housing for manufacture, repair, or replacement. The assembly is a stack of porous filter media separated by perforated metal plates. The metal plates may be arranged in sets, comprising positive and negative electrostatic plates followed by magnetic plates. Or, the metal plates may be arranged in a sequence tailored for the electrical conductivity of a given fluid. A pair of rod electrodes are threaded through holes in the various plates and porous filter media. One rod electrode is connected to all positive plates. The other rod electrode is connected to all negative electrostatic plates.

22 Claims, 5 Drawing Sheets

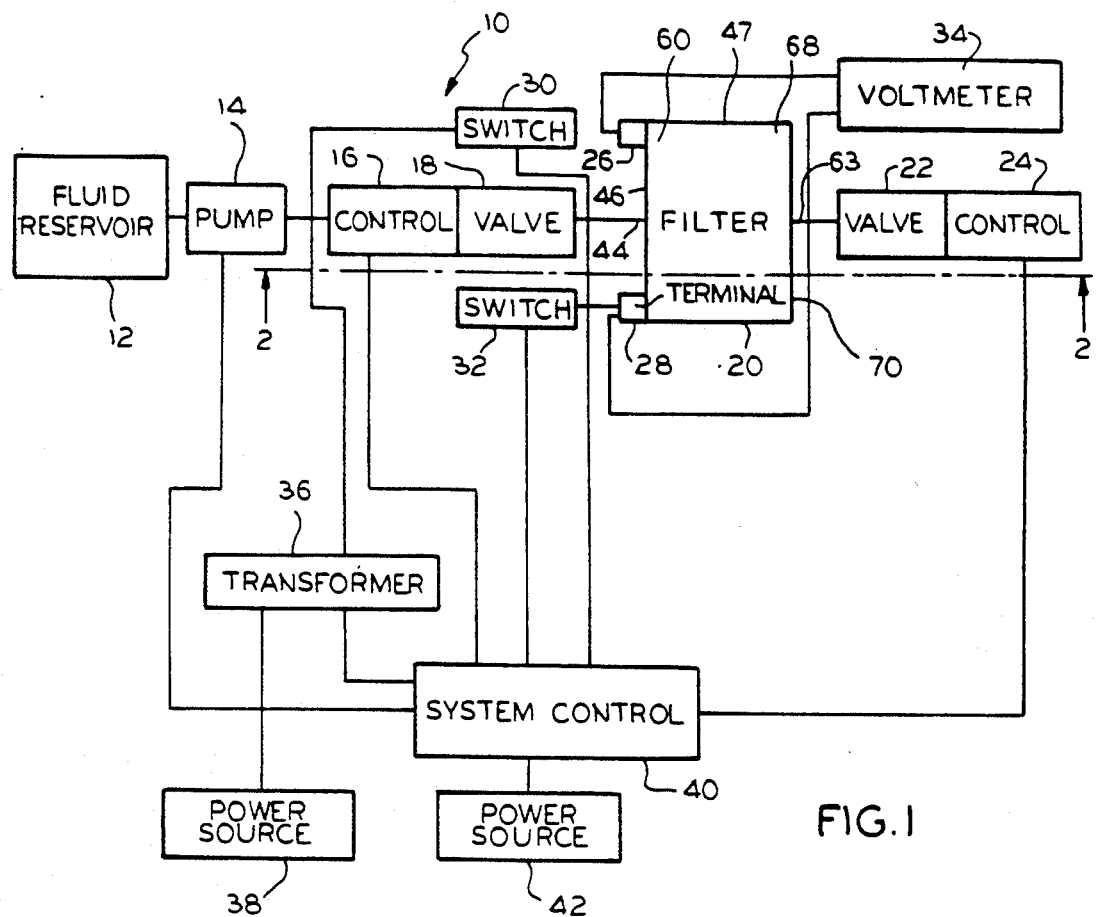
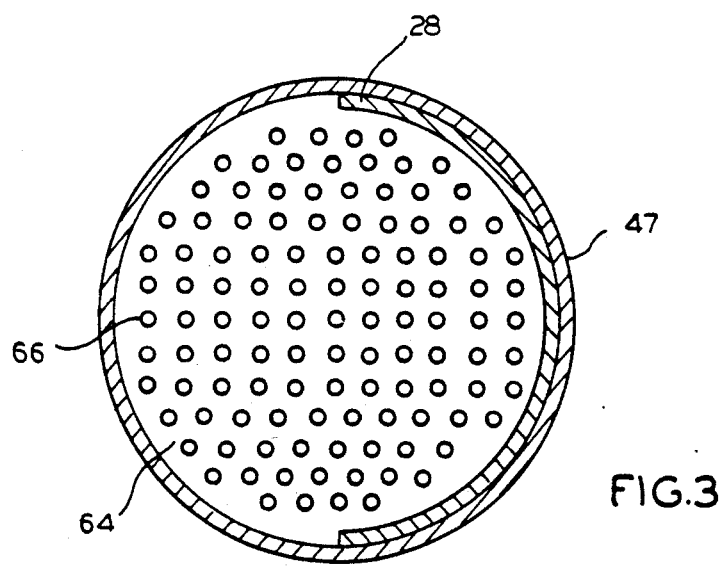
FIG.1
FIG.3

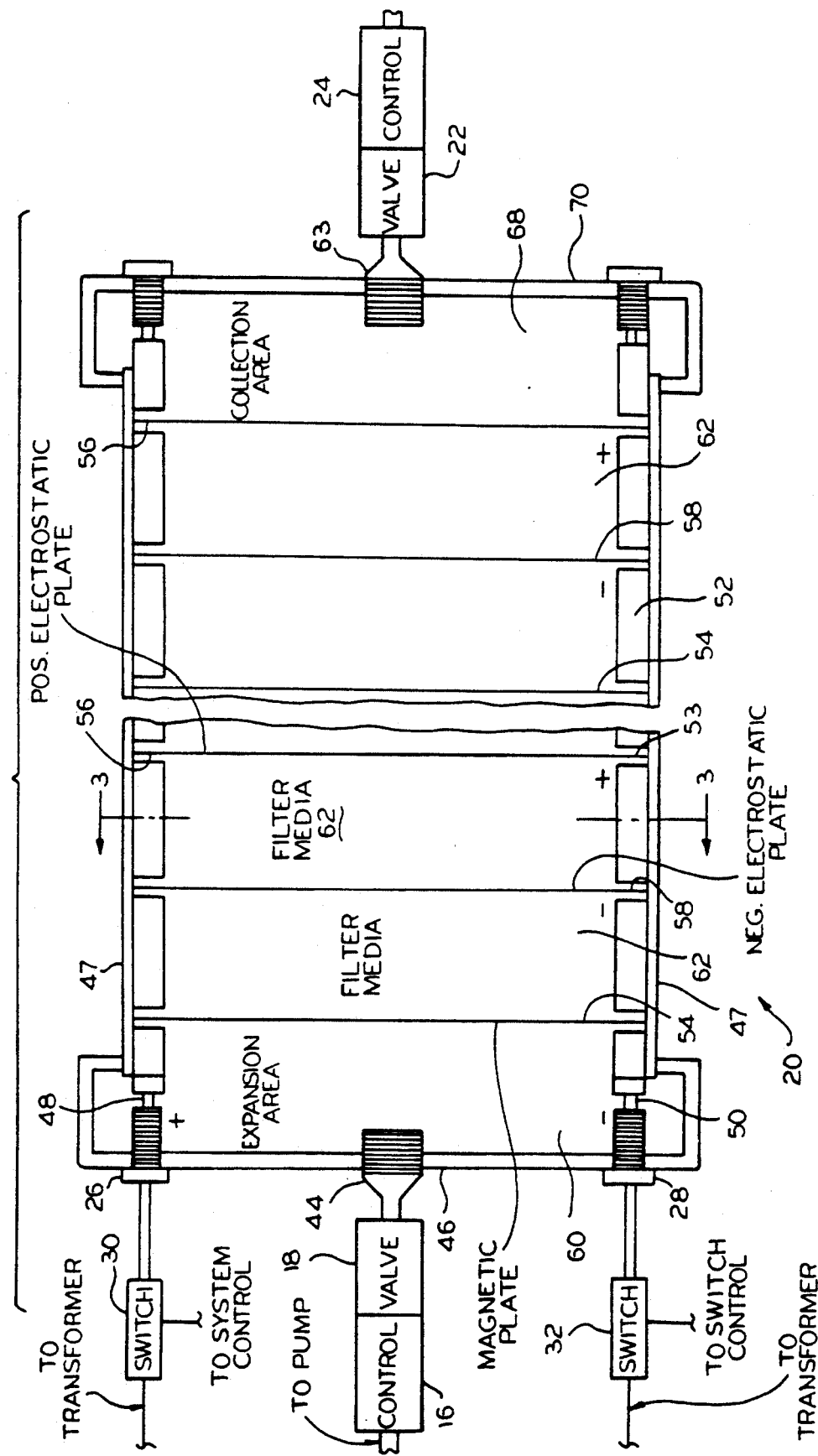

FILTER WITH POROUS MEDIA AND ELECTROSTATIC AND MAGNETIC PLATES

This is a continuation-in-part of U.S. Ser. No. 07/862,451 filed Apr. 2, 1992 (now abandoned), which was a continuation-in-part of U.S. Ser. No. 07/632,129, filed Dec. 20, 1990 (now U.S. Pat. No. 5,149,422).

BACKGROUND AND SUMMARY OF THE INVENTION

This invention relates generally to improvements in electrostatic filters for filtering and rejuvenating contaminated fluids, such as oils and the like, and more particularly, to improved filters which are easier to manufacture.

Basic structures for removing finite particles by systems employing electrostatic or magnetic means are well known in the art. For examples of such systems, see the following patents:

| U.S. Pat. No. | | |
|---|---|---|
| Dawson, et al. | 4,961,845 | 10-9-90 |
| Scott, et al. | 4,941,959 | 7-17-90 |
| Hirama | 4,935,133 | 6-19-90 |
| Eggerichs | 4,879,045 | 11-7-89 |
| Pera | 4,716,024 | 12-29-87 |
| Scott, et al. | 4,767,515 | 8-30-88 |
| Mintz, et al. | 4,634,510 | 1-6-87 |
| Nozawa, et al. | 4,620,917 | 11-4-86 |
| Panson, et al. | 4,594,215 | 6-10-86 |
| Thompson | 4,594,138 | 6-10-86 |
| Collins | 4,303,504 | 12-1-81 |
| Stegelman | 4,285,805 | 8-25-81 |
| Robinson | 4,254,393 | 3-3-81 |
| Wolf | 4,238,326 | 12-9-80 |
| Watson | 4,190,524 | 2-26-80 |
| Noland, et al. | 4,025,432 | 5-24-77 |
| Davies | 3,655,550 | 4-11-72 |
| Van Vroonhoven | 3,484,362 | 12-16-69 |
| Lochmann, et al. | 3,398,082 | 8-20-68 |
| Waterman, et al. | 3,393,143 | 7-68 |
| Miyata | 3,349,143 | 10-24-67 |
| Griswold | 3,252,885 | 5-24-66 |
| Polish Patent | 45457 | 2-24-62 |

From this prior art, it is clear that the filtration and effectiveness of a filter is improved by a sue of either or both electrostatic and magnetic force fields.

Such electrostatic and magnetic filters have become quite popular in recent years, especially to filter oils or other petroleum products and provide alternatives to purchasing new fluids after the original supply becomes contaminated. Furthermore, environmental concerns regarding the disposal of used, contaminated fluids has led many users to seek methods for filtering and rejuvenating those fluids.

Many different configurations of electrostatic or magnetic filters have been employed in the past. The patent of Miyata, U.S. Pat. No. 3,349,354, generally discloses a device for treating hydrocarbon fuels with both electric and magnetic fields. Specifically, this patent discloses the use of rod or bar magnets to generate a magnetic field, and of another rod to generate an electric field. It is unclear if this device has any filtering properties.

The patent of Lochmann, et al., U.S. Pat. No. 3,398,082, discloses a method for electrostatic filtration of dielectric fluids by using a plurality of alternatively charged electrostatic perforated plates. However, Lochmann, et al do not contemplate the addition of a magnetic field along with the electrostatic fields generated by the perforated plates. The patent of Van Vroonhoven, U.S. Pat. No. 3,484,362, also discloses the use of a dielectric filter media disposed between adjacent electrostatic elements inside the filter. This patent does not use magnetic field either.

The patent of Robinson, U.S. Pat. No. 4,254,393, discloses the use of both electric and magnetic fields to treat a hydrocarbon fuel. This patent does not contemplate either a serial alternation of areas bearing different charges or serial alternation of those areas with magnetic areas. Also, it is not clear that this U.S. Pat. No. 4,254,393 has any filtration effects.

The current market for fluid filters for use with fluids and the like is vast and demanding. The machines which these filters service are made with high precision and generally require fluids that are substantially free of contaminants. Due to the costly operation and repair of these machines, it is necessary that these filters perform their functions with extreme accuracy. Further, depending on the particular fluid that is being filtered, it may be necessary to target specific contaminants for removal. Filters should also be able to remove contaminants of small size, for example in the order of five microns or less in diameter. Also, filters employed in heavy industry need a control system that can effectively monitor the operation of the filter.

The filter system shown in the parent application Ser. No. 07/632,129 is a very good design; however, it is more costly to manufacture than might be reasonably expected. Also, there are expansion gaps which contain conductive strips which may cause problems under some circumstances.

Various fluids have different electrical conductive or magnetic responsive characteristics. Thus, the electrical or magnetic fields that are built up inside the filter should have different characteristics depending upon the characteristics of the fluid being filtered. It has been found that, for any given fluid or fluids, tests may be run in order to discover the nature of fields which best serve the needs of those fluids. Once the test data is available for a number of fluids, a data base may be established which will provide the specifications of a filter for a new and unknown fluid.

Accordingly, a filter should have a design which enables it to be configured different ways to meet the needs of new fluids. It would appear that an ideal filter design would be one which the same parts may be assembled in different ways to accommodate different fluids.

OBJECTS AND SUMMARY OF THE INVENTION

Therefore, an object of the invention is to provide new and improved filter means of the described type. Here the object is to provide improved filters which are easier to manufacture and which are more efficient when in use. In particular, an object is to provide a filter design which may be assembled in different ways to meet the needs and characteristics of many different kinds of fluids.

A general object of this invention is to provide a particle removal system that has greater efficiency and accuracy than has been possible heretofore. Another object is to employ a filter having an alternation of magnetic and differently charged electrostatic perforated plates disposed at various locations in the interior of the filter so that the fluid which is to be filtered and rejuvenated must pass through the perforations of each plate. Still another object is to provide a porous filter media disposed in spaces between the successive plates.

Yet another object of the invention is to provide groupings of various electrostatic and magnetic plates to customize the filter to specific fluids which are to be filtered. Here an object is to target specific contaminates or which provide more efficient operation with specific fluids.

Another object of the invention is to provide a means for determining when the time has come for cleaning the filter, without requiring a bypass valve.

Yet another object of the invention is to provide an electrostatic filter that can produce particle agglomeration effect, thereby increasing the efficiency of the filter.

An object of the invention is to provide a magnetic field that targets and removes specific contaminants.

A further object of the invention is to provide a filter wherein the size of the perforations on the plates is less critical to a proper operation of the filter.

Yet a further object of the invention is to provide a system that advances the environmental and ecological interests inherent in recycling spent fluids.

In keeping with an aspect of the invention, a filter comprises a plurality of spaced apart alternating magnetic, negatively, and positively charged perforated plates, with filter media disposed in the space between the plates. The plates and filter media are held in place by a combination of plastic tube spacers with electrode rods in the form of bolts passing through the entire assembly. These bolts may be tightened to make a more trouble-free assembly. The fluid to be filtered is forced through the perforations in the plates, and is subjected to the forces created by the charges on the plates. By changing the lengths of various spacers and the order and grouping of plates the filter may be tailored to the needs of different fluids.

The control system for the present invention does not enable an operation of a pump for forcing the fluid through the filter until a charge sufficient for the proper operation of the filter appears on the plates inside the filter. Thus, no fluid may exit the filter without experiencing the full rejuvenating effects of that filter. Furthermore, a voltmeter/ampmeter attached across the terminals supplying voltage to the electrostatic plates of the filter provides for a monitoring of the level of contamination inside the filter, without requiring bypass valve. Thus, a voltmeter/ampmeter reading indicates a time for cleaning the filter. This construction of the finite particle removal system increases the effectiveness of the systems.

BRIEF DESCRIPTION OF THE DRAWINGS

The structure and operation of the invention, is shown in the accompanying drawings, in which:

FIG. 1 is a schematic diagrams of the inventive finite particle removal system;

FIG. 2 is a cross-sectional view of one embodiment of a filter showing a portion of the finite particle removal system, taken along line 2—2 of FIG. 1;

FIG. 3 is a cross-sectional view of a portion of the filter, taken along line 3—3 of FIG. 2, showing a particular construction of one of the perforated plates;

In FIG. 1, a finite particle removal system 10 comprising a filter 20 is constructed according to the teachings of the present invention. Although this particular filter is shown here, it is to be understood that a differently constructed system may be employed without departing from the spirit or scope of the invention.

Figure 4:
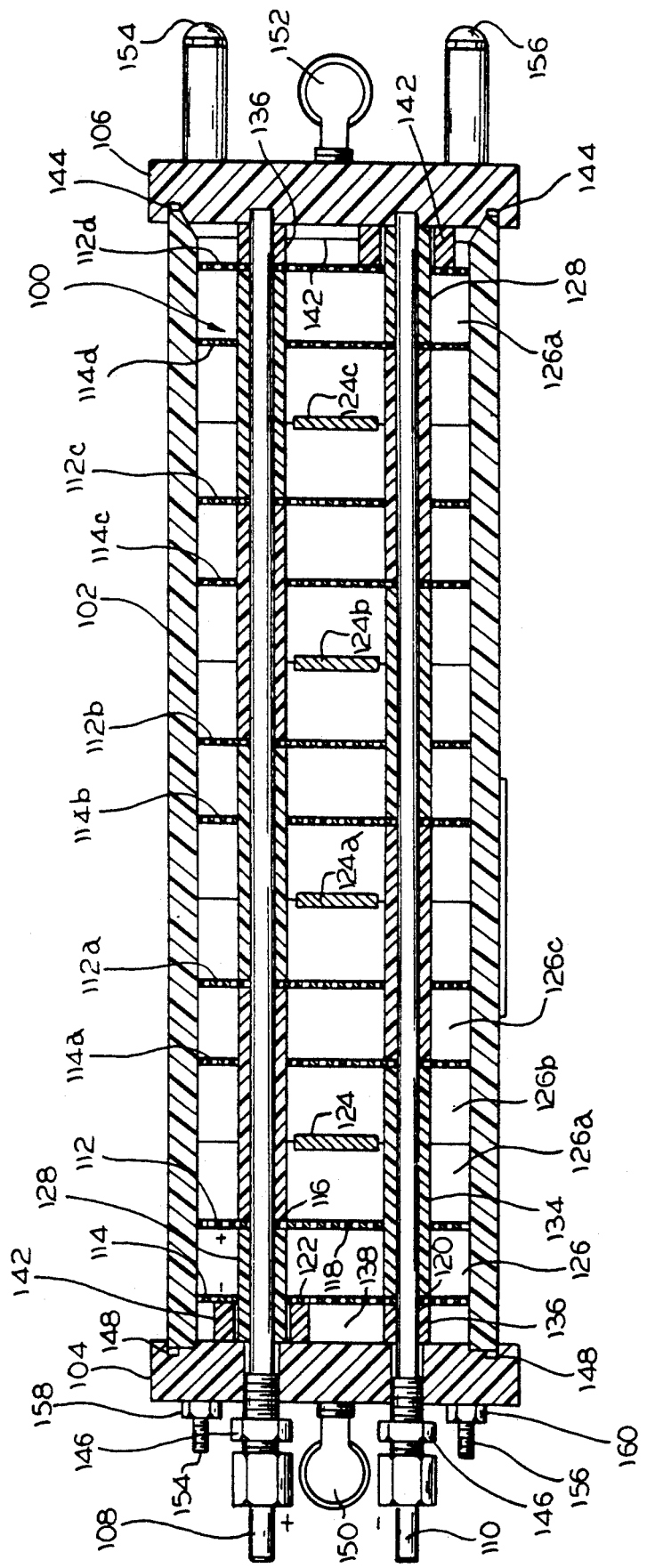
FIG. 4 is a cross-section of a second embodiment of the inventive filter.

Upon operation of the finite particle removal system 10, a fluid to be filtered flows out of fluid reservoir 12 under the force of pump 14 which provides a sufficient force to transport the fluid throughout the system 10. The fluid flows through the system when the valve 18 is in the open position. As the fluid flows through the filter 20, finite particles or contaminates are removed from the fluid. This filtering process, as well as the particular construction of the filter 20, will be discussed further in relation with FIG. 2.

Once the fluid has traveled through the entire length of the filter, the fluid exits the filter 20, and encounters a valve 22 which prevents the fluid from reversing direction and flowing back into the filter 20 and which prevents fluid from flowing out of the filter 20 when it is not in operation. The valve 22 is governed by a controlling mechanism 24.

FIG. 2 discloses the particular construction of one embodiment of the filter 20 which is contained within a substantially cylindrical tubular wall 47, having its ends covered by two end caps 46 and 70. These end caps 46 and 70 complete the enclosure of the filter 20 and effectively seal it to prevent any leakage. The front end cap 46 has three apertures for the insertion of a fluid at inlet 44, a positive electrical terminal 26, and a negative electrical terminal 28, all of these apertures being suitably sealed. The opposite or downstream end cap 70 is constructed similarly to the front end portion 46, with the exception that the downstream end portion 70 has only one aperture, for the exit of fluid via outlet fitting 63.

The fluid inlet 44 accepts fluid from the system 10 and transmits it into an expansion area 60 at the interior entrance of the filter 20. On the other end of the filter 20, the fluid outlet 63 accepts filtered fluid from collection area 68.

Perforated metal plates 54, 56 and 58 (FIG. 3) are spaced uniformly across the length of the filter 20. These perforations allow passage of the fluid to be filtered. While these plates 54, 56, and 58 have a circular shape, they may be any suitable shape extending completely across the cross-sectional area of the interior of the filter 20.

When the fluid passes through the perforations 66, it is subjected to the electrostatic or magnetic forces imparted by the respective plate. The actions of these forces increase the effectiveness of the filter 20. The size of the perforations 66 is not critical to the proper operation of the filter 20, and is primarily dependent on the fluid to be filtered.

Portions of a filter media 62 are disposed along the length of the filter 20 and between the plates 54, 56, and 58. This filter media 62 is of known composition and is often used in the art. While any of many filter media may be used, the preferred media is known in the art as "100 PPI" (pores per inch). This filter media 62 fills the entire space within the interior of the filter 20 that is located between each two consecutive plates 54, 56, and 58, but is not disposed in either the expansion area 60 or the collection area 68.

In the construction shown in FIG. 2, the fluid to be filtered enters the filter 20 through the fluid inlet 44, and collects in and fills the entire expansion area 60, so that the entire cross-sectional area of the filter 20 is effectively exposed to the fluid.

Then, the fluid encounters a magnetic plate 54 made of a permanent magnetic material, such as magnet steel, ceramic, and the like. Each of these plates 54 generates a magnetic field that is concentrated about the perforations 66, to cause magnetic contaminants, such as metals, to be attracted and to become bound to the plates 54.

Once it passes through the perforations 66 in the magnetic plates 54, the fluid to be filtered encounters the porous filter media 62, which both captures much of the contaminates and aids in the filtration process. The filter media 62 traps contaminants of sufficient size.

The fluid then passes out of the filter media 62 and encounters an electrostatically charged negative plate 58. Due to the electrostatic charge on this plate 58, many contaminants present in the fluid receive a negative charge so that they are repelled from plate 58 due to the Coulomb force. These charged particles may be trapped in the filter media 62 located in front of that plate 58.

Contaminants that have a positive charge are attracted by and cling to the negative charged particles 58. Contaminants having no charge also pass through the perforations 66 in the plate 58 and may or may not accept a negative charge depending upon their characteristic. The negatively charged contaminants are attracted to the positive charge present on the following positive plate 56.

When the contaminants encounter the positive plate 56, an effect similar to the effect of the negative plate 58 takes place. Positively charged contaminants that remain in the fluid are repelled by the positive charge on the plate 56 and seek negative particles, are held in the filter media 62 disposed between the positive plate 56, and are attracted to the negative plate 58. The particles accept a positive charge as they pass through the perforations 66 in the positive plate 56, where they are forced into the filter media 62 behind the positive plate 56.

As the fluid advances through the filter, any contaminants remaining in the fluid go through the same four step process again and again, depending on the number of metal plates 54, 56, and 58 and porous filter media that are disposed on the filter 20.

It has been found that a series of eight plates (at least two magnetic, three having positive electrostatic charge, three having a negative electrostatic charge) is sufficient to produce satisfactory filtration results. However, for example, another preferred embodiment may have fifteen plates: five each of magnetic, positively electrostatically charged, and negatively electrostatically charged, disposed in serial order throughout the interior of the filter 20.

Once it has passed through the entire length of the filter 20, the fluid enters into and gathers in the collection area 68, from where it is finally transmitted out of the filter 20 through the fluid outlet 63 and on through the remainder of the system.

This disposition of the electrostatic plates 56 and 58 causes an agglomeration effect which significantly adds to the effectiveness of the filter 20. Specifically, the electrostatic charges on the contaminants causes them to form an agglomerate, which increases in size until it can no longer pass through the filter media 62. The filter 20 is more effective because it is able to capture smaller particles due to the agglomeration process.

Also, charged contaminants are attracted to and bound to oppositely charged particles and magnetic fields. Once one contaminant is bound to another contaminant, that contaminant extends outwardly and away from the other contaminant, increasing the surface area.

The electrostatic charges needed for proper operation of the filter 20 are supplied by a transformer 36 which receives electrical power from a power source 38. The transformer 36 preferably is capable of delivering a variable voltage within the range of 1,000 to 15,000 volts to the filter 20 via a positive terminal 26 and a negative terminal 28. Switches 30, 31 are governed by the system control 40. The application of this voltage induces an electrostatic charge on the electrostatic plates disposed within the interior of the filter 20. The voltage across the positive terminal 26 and the negative terminal 28 is monitored by a voltmeter/ampmeter 34.

The entire operation of the finite particle removal system 10 is governed and monitored by a system control 40 which performs a variety of functions, and receives its power from a power source 42.

Beginning with a shut down condition, all valves are closed, no charges are present on the plates of the filter 20, and all elements are inactive. The system control circuit 40 causes the transformer 36 to apply a voltage through the switches 30, 32 to the negative terminal 28 and the positive terminal 26. This voltage induces a charged on the electrostatic plates 56 and 58 of the filter 20.

After a certain time period, preferably in the order of five seconds or more, following the application of the voltage to the terminals 26 and 28, the system control circuit 40 operates the pump 14, and causes the controlling mechanism 16 to open the valves 18 and 22. The fluid flows through the fluid inlet 44 and into the expansion area 60, through the perforations 66 in the plates 54, 56, and 58 and through the filter media 62. As the fluid flows through these elements, contaminants are removed from the fluid. Once the fluid has been so treated, it flows into the collection area 68 of the filter 20 and from there flows out of the filter 20 through the fluid outlet 63.

It is important that there be a time delay between the application of the voltage to the filter 20, the initialization of the pump 14 operation, and the opening of valves 18 and 22. This time delay ensures that an appropriate charge been has built up on the electrostatic plates 56 and 58 of the filter 20.

Also, the voltmeter/ampmeter 34 is monitored by the system control circuit 40, thereby allowing a shut down of the operation of the system 10 at a predetermined voltage level. More particularly, the voltmeter/ampmeter is connected across the positive terminal 26 and the negative terminal 28 to measure the potential difference between them.

Inside the filter 20, the positive terminal 26 is electrically connected to the positive conductor 48, which receives a voltage applied by the transformer 36, through the switch 30. The conductor 48 is disposed substantially parallel to the arcuate wall 47, and extends along the entire length of the filter 20. Preferably, the conductor 48 is substantially half-cylindrical in its cross-section, lining about 180-degrees inside the arcuate wall 47 of the filter 20, to provide a maximum area for the disposition of the plates 54, 56, and 58 and the filter media 62.

Inside the filter 20, the negative terminal 28 is electrically connected to the negative conductor 50, and delivers a voltage applied by the transformer 36, through the switch 32. The conductor 50 is also substantially half-cylindrical, and lines about 180-degrees inside the arcuate wall 47 of the filter 20. The positive and negative conductors 48 and 50, respectively, are disposed so that there is no possibility of physical contact or short circuit between them.

Also located inside the filter 20, expansion joints 52 are disposed substantially parallel to the arcuate wall 47, the positive conductor 48, and the negative conductor 50, with one edge thereof abutting the conductors 48 and 50. These expansion joints 52 are composed of insulating material, such as PVC or the like, in order to prevent a contact between the electrostatically charged plates 56 and 58 and to prevent a short circuit. However, the expansion joints 52 are not continuous over the entire length of the filter 20. Specifically, apertures 53 are regularly spaced along the expansion joints 52, to provide an electrical contact with and a support for the individual plates 54, 56, and 58. Thus, the positive and negative conductors 48 and 50 apply the voltage from the transformer 36 to the positive and negative plates 56 and 58, respectively.

Another significant improvement of the filter 20 over the prior art is the use of an voltmeter/ampmeter 34 to monitor the amperage across the positive terminal 26 and the negative terminal 28. While the filter 20 is in operation, contaminants collect between the electrostatic plates 56 and 58, and in the filter media 62. Once it reaches a certain level, this collection causes a change in voltage across the terminals 26 and 28. Specifically, the voltmeter/ampmeter indicates when the filter media 62 becomes substantially impregnated with contaminants, or when contaminants agglomerate to form an electrical connection between positively charged and negatively charged plates. A voltage drop becomes evident long before the contaminants collect in sufficient amounts to form a short circuit in the filter 20.

Therefore, by monitoring the voltmeter/ampmeter 34, the operator of the system 10 knows when the filter has become dirty and in need of cleaning. The system control circuit 40 can also monitor this voltage automatically, and shut down the entire system 10 when necessary. This use of voltmeter/ampmeter 34 eliminates the need for a bypass valve to measure the effectiveness of the filter 20.

Some of the considerations which go into the manufacture of the described type of filters have led to new and improved embodiments (FIG. 4). First, there is a need for a constant and predictable product which does not vary from item to item. This need is satisfied in the invention by a use of electrode rods which have threaded ends for receiving nuts, which may be drawn to a precise tension for more accurately securing the assembly of the plates. Second, there should be a predictable certainty that contaminated oil will not by-pass any of the filter elements. For example, if plates are cut from a pre-perforated plate, such a cut could go through a perforation hole giving an unanticipated path around the plate. A plate which is simultaneously perforated and shaped in a punch press die, can have perforation holes which are at known locations and are contained entirely within the perimeter of the plate, thus eliminating the possibility of unanticipated sneak paths for unfiltered fluid to flow through.

Another consideration is the arcing that is possible when the high voltages are used in the filter. It is important to avoid all sharp points and edges which might cause an accumulation of electrons which could induce a formation of an arc. The invention preferably uses voltages in the order of 1,000–15,000V per electrostatic plate, with a total potential difference between positive and negative plates being in the order of 0–400 uA. The current is in the order of 0–400 uA. Under these conditions and unless great care is used in manufacturing, arcs may form over substantial distances in the order of a half-inch, more or less.

This need for arc avoidance has caused manufacturers of the embodiment of FIGS. 2, 3 to use an RTV (room temperature vulcanization), a rubber-like caulking component. This material tended to be messy and required labor intensive skills to apply. The embodiment of FIG. 4, does not require any such caulking.

Yet another consideration is the manufacture and maintenance personnel's ability to assembly, disassemble, repair, and rehabilitate the filter while it is outside of a filter housing, as distinguished from building or repairing it inside the filter housing. Among other things, these considerations are accommodated by providing removable end caps which are sealed in place by O-rings. This is important for cost reduction, for the opportunity to inspect, and for backflushing or washing away contaminates or replacing filter material or worn parts. Another important consideration is making repairable units instead of throwaway units because there is a environmental concern for not having to discard vast numbers of spent filter systems.

FIG. 4 shows an embodiment for providing structures responding to all of these considerations. More particularly, the major assemblies of this embodiment include a removable assembly 100 of plates, plastic housing 102, two end caps 104, 106, and a pair of assembly bolt/electrodes 108, 110.

The plate assembly 100 comprises a stack of positive and negative perforated plate electrodes, such as 112 and 114. It will be noted that alternate ones of these plate electrodes are connected, in turn, to individually associated ones of the electrode rods. For example, the positive electrode rod 108 passes through a hole in and makes contact with the positive perforated plate electrode 112. The negative electrode rod 110 also passes through a hole 118 in the perforated plate electrode 112; however, the diameter of hole 118 is much greater than the diameter of bolt 110 A PVC insulating tube 134 separates rod 110 from plate 112 so that there is no electrical contact between rod 110 and plate 112.

Likewise, the negative electrode rod 110 makes contact at 120 with the negative perforated plate electrode 114, again via an undersized hole, to insure good electrical contact. Also, the hole at 122 is much larger than the diameter of the rod and a PVC spacer 128 is present so that there is no electrical contact.

By inspection, it is seen that the positive perforated plate electrodes 112a, 112b, 112c, 112d alternate with the negative perforated plate electrodes 114a, 114b, 114c, 114d, and further that they are uniformly spaced throughout the housing.

A magnetic perforated plate 124 is positioned between each negative-positive pair of perforated plate electrodes. For example, magnetic plate 124 is between a first negative-positive pair 112, 114 and a second negative-positive pair 112a, 114a. Three other magnetic plates 124a, 124b, 124c are similarly positioned relative to the electrostatic plates.

Individual spacers 126, 126a, 126b, 126c, ... 126n are located between each two adjacent perforated plates. These spacers are made from any suitable filter material, preferably that known in the trade at 100PPI.

The following specifications describe the preferred filter materials:

DESCRIPTION (1) For Hydraulic Fluid and Motor Oil:
80 ppi SIF-Z
Polyurethane foam
12-sided reticulated cells (pores)
1.38" diameter×1" 80 ppi charcoal foam
3⅛" diameter×1" 80 ppi charcoal foam
6¼" diameter×1" 80 ppi charcoal foam (2) For Transformer Oil; Dielectrical Oil; Some Hydraulic Oil; and Solvents:
100 ppi SIF-Z
Polyurethane foam
12-sided reticulated cells (pores)
3⅛" diameter×1" 100 ppi natural foam
6¼" diameter×1" 100 ppi natural foam (3) For Some Solvents:
3-900 ppi SIF-Z
Polyurethane felted foam
3" compressed into 1"
12-sided reticulated cells (pores)
1 5/16" diameter×1" 3-900 psi felt
3⅛" diameter×1" 3-900 ppi felt
6¼" diameter×1" 3-900 ppi felt
11" diameter×1" 3-900 felt These filter materials are available from a number of sources, such as:

Stephenson & Lawyer Inc.

3831 Patterson Avenue S.E.

Grand Rapids, Mich. 49518-8834

Thus, it is seen that the filter assembly comprises a series of porous filter media 126 separated by the perforated metal plates 112, 114, and 124. In the embodiment of FIG. 4, the plates are provided in repeated sets of three plates. A first plate 112 in each set being electrically connected to first electrode rod 108 as at 116 and insulated from second electrode rod 110 as at 118. The next and second plate 114 in each set is electrically connected to the second rod 110 and insulated from the first rod 108. The next and third plate 124 is a magnetic plate which completes the set of three plates. The PVC spacers both provide added insulation between rods and plates and help fix the distances between the plates in order to conform the resulting space to the thickness of insulation plates.

In order to make the assembly, a number of spacers are made by cutting PVC pipe in specific lengths. To make the spacers, it is preferable to cut them on a screw machine since there will be a sharp and well-defined edge at each cut, as distinguished from a relatively fuzzy or ragged edge which would be produced if the cut is made by a saw, for example.

For example, spacers 128 are long enough to fit between and contact first perforated plate electrode 112 or 122d and an end cap 104, 106, respectively. Spacers, such as 134, are long enough to extend from a perforated plate electrode of a first polarity (such as 114) through a perforated plate electrode of opposite polarity (such as 112) and a magnetic plate (such as 124), to the next succeeding perforated plate electrode 114a of the first polarity. A third spacer length 136 is as long as the depth of the accommodation chambers 138, 140 at opposite ends of the assembly.

It should be noted that the outside diameter of the PVC pipe forming the spacers is less than the diameter of the large holes (such as 118, 122) at the non-connection point. Thus, the PVC provides electrical insulation between the rod and plate electrodes, but does not touch the plate.

Preferably, the rod electrodes 108, 110 and plate electrodes 112, 114 are made of a suitable Conductive material such as aluminum or copper, for example. Aluminum is usually the preferred material because it costs less than copper. Preferably the plate electrodes are formed in a punch press die, with care being taken to avoid sharp edges where electrons may accumulate to cause possible arcing.

In order to assemble the filter, the two rod electrodes 108, 110 are threaded through holes which are perforated in each of the plates, the plates being added to the assembly in the described order, with the filter material between them. Then the rods 108, 110 are joined to an end-cap 106 in any suitable manner. At each end of the resulting stack of assembled plates, there is a spacer 142, 142 with an over-sized hole placed over each end of a long PVC spacer 128 and a short spacer 136 placed over the exposed rod 108 or 110. These two spacers 136, 142 are the same length in order to hold the last plate parallel to an end cap and to provide collection spacers 138, 140 at the entrance and exit of the filter.

Next, a plastic cylindrical housing 102 is slid into place over the stack of assembled plates and sealed to end cap 106 by an O-ring 144. The plastic end cap 104 is placed over electrode rods 108, 110, and then suitable nuts are used on the threaded ends of the rods to secure the end cap in place. An O-ring 148 seals the cap 104 to the housing 102. Entrance and exit fittings 150, 152 are added in order to transmit the fluid to be processed into and out of the housing.

To further seal the unit, four steel bolts, such as 154, 156, are threaded through or alongside the housing to further help draw the end caps into tight contact with the housing tube 102. These bolts 154, 156 are secured in place by nuts 158, 160. If the perimeters of the end caps are generally square, the bolts 154, 156 are preferably located at each corner of the square so that they pass along and adjacent the outside of the housing 102.

The operation of the embodiment of FIG. 4 is essentially the same as the operation of the embodiment of FIG. 2. The advantages of the FIG. 4 embodiment are a greater precision in manufacturing, easier cleaning and repair, greater reliability and uniformity from filter to filter, and less throw-away elements which may contribute to a pollution of the environment.

The foregoing description is directed to a generic fluid with no special problems. There may also be fluids with special electrical conductivity or other characteristics. Accordingly, FIGS. 5A-D show exemplary ways of varying the fields within the filter in order to accommodate different types of fluids.

Figure 5A:
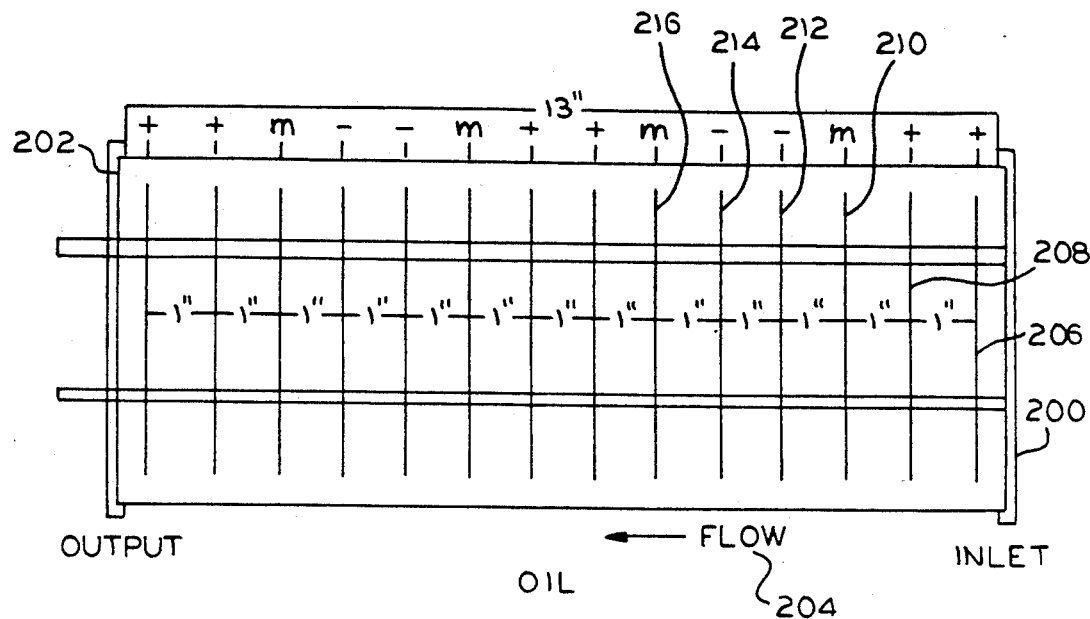
FIGS. 5A–5D are four exemplary schematic diagrams showing how the organization and sequence of plates may be varied for customizing the filter in order to target the characteristics of specific fluids.

FIG. 5A is a configuration selected for certain oil, wherein the electrostatic plates are arranged in pairs of like polarity with magnetic plates between them. In greater detail, this FIG. 5A embodiment has an input for receiving untreated fluid at end 200 and an output for delivering filtered fluid at end 202, with fluid flowing therebetween, in direction 204. The in-flowing fluid first encounters two positively charged electrostatic plate electrodes 206, 208 and then a magnetic plate 210. After the magnetic plate 210, the fluid encounters two negatively charged electrostatic plate electrodes 212, 214, followed by another magnetic plate 216. Thereafter, the described cycle of electrostatic and magnetic plates repeats.

Figure 5B:
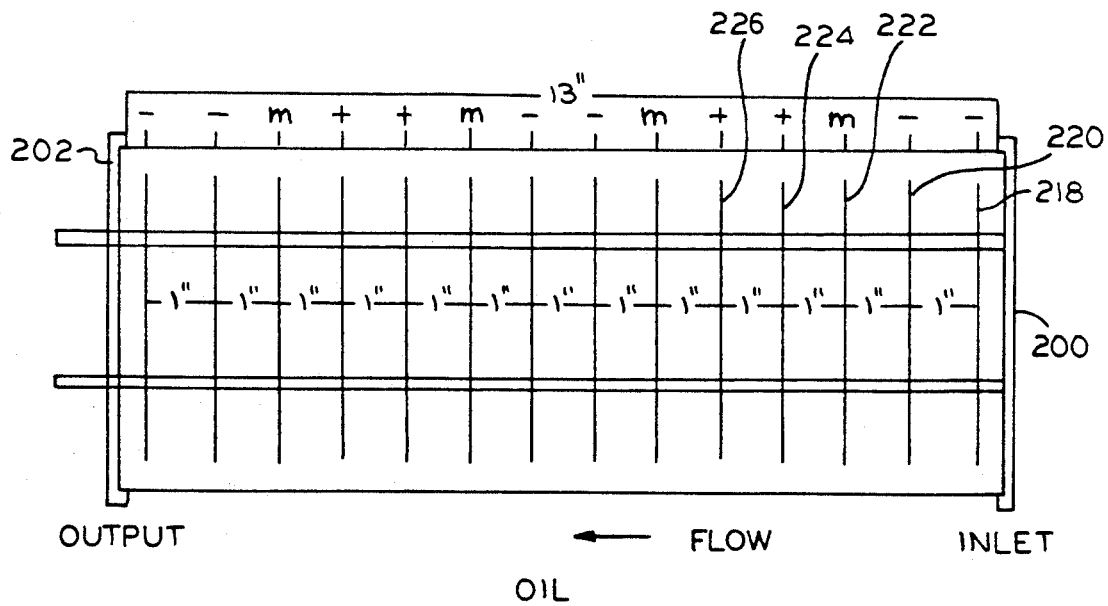

In the FIG. 5B embodiment, the construction is similar except that the polarities of the electrostatic plate are reversed. Thus, the incoming fluid first encounters two negatively charged electrostatic plate electrodes 218, 220, followed by magnetic plate 222. After the magnetic plate, the fluid encounters two positively charged electrostatic plate electrodes 224, 226.

In FIGS. 5A, 5B, the plates may be separated by any suitable distance such as one-inch so that the over all filter length is about thirteen inches.

Figure 5C:
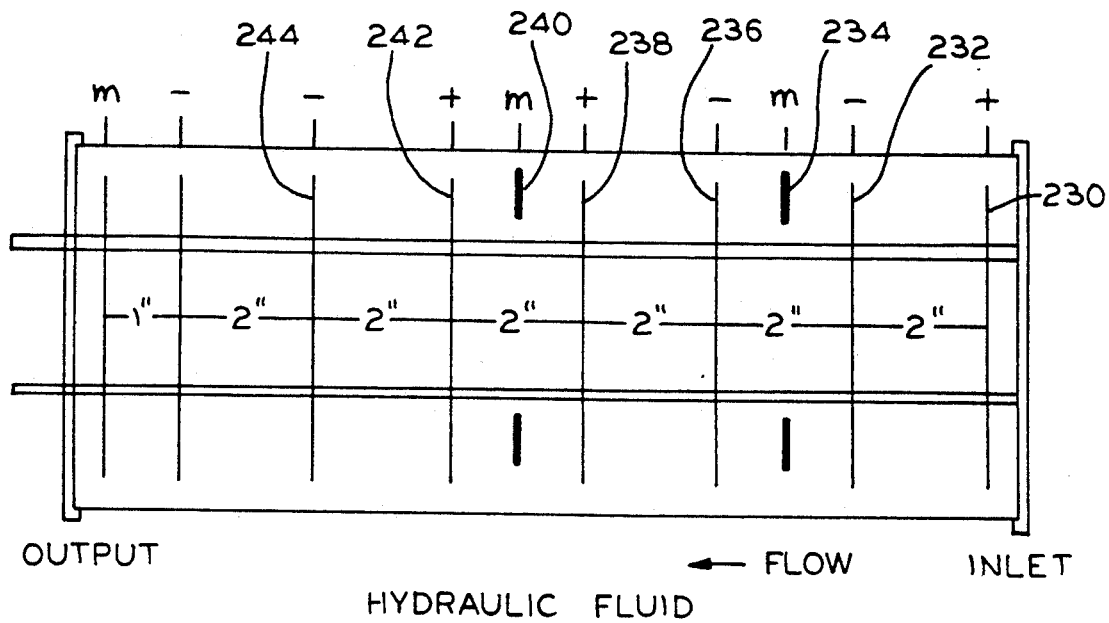

In FIG. 5C, the sequence is first a positively charged electrostatic plate electrode 230, then a negatively charged electrostatic plate electrode 232 followed by an annulus or toroidal magnet 234. The second cycle of electrostatic plate electrodes is a negative plate 236 and a positive plate 238 followed by another magnetic annulus 240. The third cycle of electrostatic plate electrodes 242, 244, 246 include the sequence of a positive plate 242, two negative plates 244, 246, and closes with a magnetic plate 248. In this particular case, each of the electrostatic plate electrodes is separated from its neighboring plate electrodes by a two inch interval. The magnetic plate annuluses are positioned approximately two-thirds of the way downstream in that two inch interval. The closing magnetic plate is positioned an inch from its nearest neighboring electrode plate.

Figure 5D:
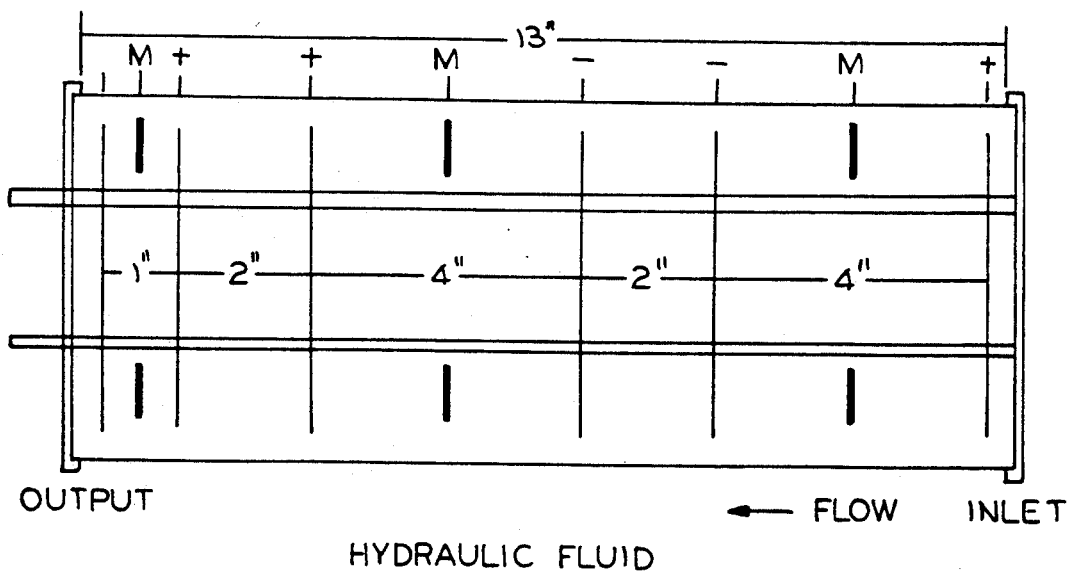

In FIG. 5D, the sequence begins with a positive electrostatic plate electrode 260 and negative electrostatic plate electrode 262 spaced four inches apart with a magnetic annulus midway between them. The next cycle of electrostatic plates electrodes has the polarities of the plates 264, 266 reversed and the magnetic annulus 268 centrally positioned on a four inch interval between the plates. There is a two inch interval 270 between the two cycles. Finally, the filter closes with a positive electrostatic plate 272 positioned two inches away from the end plate 266 of the second cycle. A magnetic annulus 274 is positioned at a location about three-quarters of an inch through a final inch of fluid collecting space.

FIGS. 5A-5D illustrate various examples of how the sequence and spacing of electrostatic plate electrodes and magnetic plates or annuluses may be varied to build a variety of force fields within the filter. The original selections and locations of plates for any family of fluids are based upon empirical data. Once a data base is established for that family of fluids, the various design modifications may be read out of the data base.

It should now be apparent that, from a manufacturing viewpoint, the various embodiments are made of substantially the same parts assembled in different ways. For example, FIG. 4 shows a number of uniformly spaced electrostatic plate electrodes, which occurs because the PVC insulator space tubes 128, 134, (FIG. 4) etc. are lengths which support the plates at uniform locations. If, for example, FIG. 4 has plates separated by one-inch, as shown in FIGS. 5A, 5B, it is only necessary to double the length of the PVC insulation spacer tubes to make the two inch spacing of FIG. 5C. Or the PVC insulation tubes may be made four times as long in order to provide the four inch spacing 276 in FIG. 5D. Likewise, almost any spacing may be provided by the simple expedient of selecting PVC insulation tube spacers of an appropriate length.

From FIG. 4, it is seen that the electrostatic plate electrode 112 is insulated from negative electrode Rod 110 by the PVC tube 134 and by the size of hole 118. The same plate 112 makes contact at 116 with positive electrode rod 108. Thus, plate 112 is described as a positive plate. However, during assembly, the plate 112 could be rotated by 180° so that hole 118 is threaded over rod 108 and hole 116 is threaded over rod 110. Then the same plate 112 would be described as a negative plate because it is energized from rod 110. Thus, the polarities of the plates shown in the FIGS. 5A-5D depend upon which hole is threaded over which rod.

Thus, it should be apparent that the differences between the various filter structures depends upon a selection of parts and of the orientation of the disks.

The inventive filter is especially adept at removing contaminants consisting of carbon compounds, especially hydrocarbons and metals. However, the filter is not limited to those particular compounds, but may remove substantially any magnetic contaminant and most other contaminants. The filter also has the ability to screen the fluid for contaminants of various sizes. Furthermore, and more importantly, the filter is capable of targeting a particular finite particle or contaminant for removal by an adjustment of the intensity of the magnetic and electrostatic fields. When considering the global environmental problems concerning the manufacture and disposal of fluids, such as oils, the filtration of which this filter was primarily designed, the usefulness and necessity of this filter becomes clear.

While preferred embodiments are shown and described, those skilled in the art may devise various modifications without departing from the spirit and scope of the appended claims. Therefore, the appended claims should be construed to include all equivalents.

IN THE INVENTION CLAIMED IS:

1. A filter for processing contaminated fluids, said filter comprising a pair of rod electrodes, an assembly of perforated plates separated by porous filter media and in threaded engagement with said pair of rod electrodes, said plates being arranged in successive sets of plates, including at least a first electrostatic plate electrically coupled to a first of said rod electrodes and electrically insulated from a second of said rod electrodes, at least a second electrostatic plate electrically coupled to said second rod electrode and electrically insulated from said first of said rod electrodes, and a magnetic plate electrically insulated from both of said rods a cylindrical housing receiving said assembly, and means for introducing fluid into one end of said housing and removing said fluid from the other end of said housing.

2. The filter of claim 1 and means for removably securing end caps to close said cylindrical housing, whereby said end caps may be removed from said cylindrical housing in order to remove said assembly from and replace said assembly in said cylindrical housing.

3. The filter of claim 1 and a plurality of electrically insulating tubular spacers threaded over said rod electrodes, said spacers fixing the positions of said plates and providing at least in part said electrical insulation between said rod electrodes and said plates.

4. The filter of claim 3 wherein said plates are spaced throughout said assembly and a first plurality of said spacers have a length equal to at least twice the width of a space separating ones of said plates, each of said first spacers passing through one of said plates and abutting against two of said plates which are immediate neighbors of said one plate, the first spacers on one of said rod electrodes passing through and electrically insulating plates against which the spacers on the other of said rod electrodes abut.

5. The filter of claim 4 and other ones of said spacers having a length which off-sets said first spacers by a distance equal to said space, a first of said other of said spacers being at one end of one of said rod electrodes and a second of said other of said spacers being at an opposite end of the other of said rod electrodes.

6. The filter of claim 1 and means for applying a high potential of one polarity to one of said rod electrodes and the plates electrically coupled thereto and for applying a high potential of an opposite polarity to the other of said rod electrodes and the plates electrically coupled thereto, whereby adjacent electrostatic plates have electrostatic charges of opposite polarity.

7. The filter of claim 1 wherein said plates are separated by uniform distances.

8. The filter of claim 1 wherein said plates are separated by at least two different distances.

9. The filter of claim 1 wherein neighboring ones of said plates have alternate electrical polarity.

10. The filter of claim 1 wherein at least some of neighboring ones of said plates have the same electrical polarity.

11. The filter of claim 1 wherein said porous filter media are for hydraulic fluid and motor oil purification and contain one or more materials selected from the group comprising:
80 ppi SIF-Z
Polyurethane foam
12-sided reticulated cells (pores)
1.38" diameter × 1" 80 ppi charcoal foam
3¼" diameter × 1" 80 ppi charcoal foam
6¼" diameter × 1" 80 ppi charcoal foam.

12. The filter of claim 1 wherein said porous filter media are for transformer oil, dielectrical oil, hydraulic oil, and solvents purification and contain one or more materials selected from the group comprising:
100 ppi SIF-Z
Polyurethane foam
12-sided reticulated cells (pores)
3¼" diameter × 1" 100 ppi natural foam
6¼" diameter × 1" 100 ppi natural foam.

13. The filter of claim 1 wherein said porous filter media are for solvents purification and contain one or more materials selected from the group comprising:
3–900 ppi SIF-Z
Polyurethane felted foam
3" compressed into 1"
12-sided reticulated cells (pores)
1 5/16" diameter × 1" 3–900 ppi felt
3¼" diameter × 1" 3–900 ppi felt
6¼" diameter × 1" 3–900 ppi felt
11" diameter × 1" 3–900 felt.

14. A fluid filter comprising an elongated tubular housing having a slide-in assembly removably contained therein, said assembly comprising a stack of porous filter media separated by perforated plates, the porous filter media having a porosity such that said fluid may be pumped from one end of said housing through said filter media and said perforations of said plates the opposite end of the housing, a pair of electrode rods threaded through and holding said assembly together, the individual electrode rods of said pair, respectively making electrical contact with individually associated ones of at least some of said perforated plates, said pair of rods forming two terminals to which a two terminal voltage source may be coupled with each terminal of said source being individually associated with corresponding ones of said electrode rods for electrostatically energizing the perforated plates connected thereto, and a plurality of perforated magnetic plates interspersed throughout said assembly.

15. The filter of claim 14 wherein said plates are distributed throughout said assembly as sets of three plates in a sequence of an electrostatic plate of one polarity, an electrostatic plate of another polarity, and a magnetic plates.

16. The filter of claim 14 wherein said plates are distributed throughout said assembly in a sequence wherein the polarity of at least one electrostatic plate is the same as the polarity of at least one of its neighboring electrostatic plates.

17. The filter of claim 14 and a removable end cap sealing each end of said housing in order to contain said fluid within said housing while giving access for sliding said assembly into and out of said housing.

18. The filter of claim 14 wherein said voltage source applies potentials in the order of 1,000–15,000 volts to each of the perforated plates which are in electrical contact with a rod whereby there is a 1,000–15,000 volt potential difference between the perforated metal plates connected to said two rods.

19. The filter of claim 14 wherein said porous filter media are for hydraulic fluid and motor oil purification and contain one or more materials selected from the group comprising:
80 ppi SIF-Z
Polyurethane foam
12-sided reticulated cells (pores)
1.38" diameter × 1" 80 ppi charcoal foam
3¼" diameter × 1" 80 ppi charcoal foam
6¼" diameter × 1" 80 ppi charcoal foam.

20. The filter of claim 14 wherein said porous filter media for transformer oil, dielectrical oil, hydraulic oil, and solvents purification and contain one or more materials selected from the group comprising:
100 ppi SIF-Z
Polyurethane foam
12-sided reticulated cells (pores)
3¼" diameter × 1" 100 ppi natural foam
6¼" diameter × 1" 100 ppi natural foam.

21. The filter of claim 14 wherein said porous filter media for solvents purification and contain one or more materials selected from the group comprising:
3–900 ppi SIF-Z
Polyurethane felted foam
3" compressed into 1"
12-sided reticulated cells (pores)
1 5/16" diameter × 1" 3–900 ppi felt
3¼" diameter × 1" 3–900 ppi felt
6¼" diameter × 1" 3–900 ppi felt
11" diameter × 1" 3–900 felt.

22. A fluid filter comprising an elongated tubular housing having a slide-in assembly removably contained therein, said assembly comprising a stack of porous filter media separated by perforated plates, the porous filter media having a porosity such that said fluid may be pumped from one end of said housing through said filter media and said perforations of said plates to the opposite end of the housing, a pair of electrode rods threaded through and holding said assembly together, the individual electrode rods of said pair, respectively making electrical contact with alternate ones of at least some of said perforated plates, said pair of rods forming two terminals to which a two terminal voltage source may be coupled with each terminal of said source being individually associated with corresponding ones of said electrode rods for electrostatically energizing the perforated plates connected thereto, a plurality of perforated magnetic plates interspersed throughout said assembly, said plates being distributed throughout said assembly in a sequence of an electrostatic plate of one polarity, an electrostatic plate of another polarity, and a magnetic plate, a removable end cap sealing each end of said housing in order to contain said fluid within said housing while giving access for sliding said assembly into and out of said housing, at least one end of each of said rods forming half of a connector, and means comprising another half of said connector on said one end for securing said end caps and slide-in assembly in a sealed housing relationship.

* * * * *